Patented Jan. 19, 1954

2,666,712

UNITED STATES PATENT OFFICE 2,666,712

STICKER COMPOSITION FOR INSECTICIDES AND FUNGICIDES

Earl D. Cornwell, Downers Grove, Ill., assignor to Armour and Company, Chicago, Ill., a corporation of Illinois No Drawing. Application July 28, 1951, Serial No. 239,195

6 Claims. (Cl. 106—124)

This invention relates to a sticker composition for insecticides, fungicides, and the like. The composition is useful when the insecticide, fungicide, etc., is applied as a dust or a spray.

The present application is a continuation-in-part of my copending application, Serial No. 149,647, filed March 14, 1950, now abandoned, which, in turn, is a continuation-in-part of my copending application, Serial No. 52,137, filed September 30, 1948, now abandoned.

A sticker composition for insecticides and fungicides which may be readily dispersed in water and then, after application to surfaces, become substantially water insoluble, while at the same time tending gradually to disintegrate under surface weathering, has long been desired. There are substances which may be applied to plants for the purpose of holding the insecticide or fungicide but unfortunately these substances continue to be water soluble after drying and are diluted and washed away by rain, heavy dews, etc. The ideal is to have a sticker composition which is readily dispersible in water while becoming insoluble after application to plants, etc., and later, after the insecticide or fungicide has served its purpose, tending to disintegrate under weather conditions.

An object of the present invention is to provide a sticker composition for insecticides, fungicides, etc., having all of the above desired features. A further object is to provide a sticker composition useful in sprays or in dust compositions for the control of insect and plant diseases, etc., in which a sticker material is employed which will readily be dispersed in water and shortly after application to plants become substantially insoluble while disappearing later after weathering. Other objects and advantages will appear as the specification proceeds.

The blood may be whole blood or any fraction thereof. I prefer to employ soluble dried blood such as, for example, the commercial product prepared by the drying of blood obtained from animals in slaughtering houses. Soluble dried blood forms an excellent starting material for a sticker composition. When thoroughly dissolved with water it becomes an adhesive and after application to plants becomes insolube in the presence of sunlight, and is not easily washed away by rain, dew, etc. The dried blood, however, when stirred into water, tends to foam greatly and forms small particles which ball together and cannot be readily put into solution. The foaming of the material in the water destroys the effectiveness of the pump employed for the spraying operation. I have found that an effective sticker composition can be produced when the soluble dried blood is mixed with bentonite and with a metal oxide bearing clay, such as, for example, sienna. The bentonite prevents the foaming of the material while also cooperating with the sienna in rendering the insoluble film responsive to surface weathering. Further, the sienna (preferably raw sienna) is effective in keeping the blood from lumping and floating on the surface of the water during mixing operation.

Whatever the respective effects of the bentonite and raw sienna, I find that the admixture therewith the dried soluble blood produces a composition which can be dispersed readily in water without substantial foaming while at the same time providing an insoluble film on the plant foliage. It is possible that the swelling of the bentonite is effective as the means for preventing foaming while the raw sienna or sienna, by reason of its sticky, fine and cohesive characteristics, clings to the blood particles and prevents the balling up or aggregating of blood particles. Apparently the bentonite with the sienna modifies the characteristics of the insoluble blood film so that it does not persist upon the fruit but breaks up under ordinary surface weathering and finally disappears after a period of a few weeks during which time the fungicide or insecticide continues to be effective.

In place of the bentonite, I find that a mixture of bentonite and pyrophyllite clay may be used with unusually successful results. The pyrophyllite clay, which is useful in insecticides and fungicides, combines with the bentonite and other ingredients in forming a coating which clings to the surface to which it is applied for a period of time and then disappears as a result of weathering. I prefer to replace about 90% of the bentonite with a pyrophyllite clay and as a result I find that there is a better wetting of the product by the water and that the pH of the mixture is lowered from about 8.6–9.0 to about 6.6–7.0.

In view of the foregoing results, I have found that an effective sticker composition can be produced when soluble dried animal blood is admixed with bentonite and sienna clays. Such a sticker composition, after forming a substantially insoluble film on the plant surfaces, tends to hold tenaciously to plant foliage and fruits, retaining with it the lead arsenate or other effective constituents used in the insecticides or fungicides.

The composition is effective, within technical limits, for forming a film upon the fruit, etc., the film becoming insoluble so that rain or dew does not tend to wash it from the fruit, etc. However, the insoluble film does not remain with the poison (insecticide or fungicide) upon the fruit to contaminate it and render it non-edible but, instead, has the remarkable quality of disintegrating under ordinary surface weathering and disappearing after a period of a few weeks. In other words, the film remains tenaciously upon the fruit in spite of rain, etc., and is effective in protecting the fruit through a vital growing and ripening period but, before the fruit is picked, the film disintegrates under weathering and disappears entirely, leaving the fruit free of the film and the poison carried thereby.

The bentonite is of the swelling type known as sodium montmorillonite. The sienna may be used in any of its forms but I prefer to use raw sienna.

The sticker composition may be formed in different proportions. I find that especially good results are obtained when the materials are mixed in the proportions of one part of raw sienna, three parts of soluble dried blood, and four parts of bentonite.

The materials are mixed in dry form and are preferably stored in sealed moisture-proof containers until they are desired for use.

The composition may be used with water to form a liquid spray containing the insecticide or fungicide, etc., or it may be used with commercial dust containing the fungicide or insecticide. In the dust uses, I find that about 4 lbs. of the sticker composition is effective when used with 100 lbs. of commercial dust containing the insecticide or fungicide. As a liquid spray, it is satisfactory to use 1½ lbs. of the sticker composition with 100 gallons of liquid spray containing the insecticide or fungicide, etc.

The sticker composition may be used with any insecticide and fungicide since these are inert with respect to the sticker material. For example, the sticker material may be used with lead arsenate, DDT, rotenone, or any of the usual insecticides, and it may be used with tri-basic copper, copper oxide, copper sulphate, zinc sulphate, sulphur or other well-known fungicides. The insecticides and fungicides and other materials used for the control of insects and plant diseases vary widely in composition and may be used in different proportions and combinations.

Extensive tests to date reveal that (1) the sticker composition described herein is not phytotoxic, i. e. does not poison or harm plants, (2) it does not impair the insecticidal or fungicidal action of the toxicants with which it is used.

As a specific example, the following may be set out:

| | Parts (by weight) |
|---|---|
| Sienna | 100 |
| Soluble dried blood | 300 |
| Pyrophyllite clay (Pyrax ABB) | 360 |
| Bentonite | 40 |

The above bentonite, which is of the jellying type described, may be varied in proportions with respect to the clay but I prefer to use the combined bentonite and clay in a proportion about four times that of raw sienna by weight and I prefer to employ soluble dried blood in a proportion equal to three times the weight of the raw sienna. By employing a greater percentage of the clay than of the bentonite, a better wetting of the product is accomplished while at the same time a more neutral pH is obtained.

A formula in which bentonite alone is used may be set out as follows:

⅛ lb. of raw sienna.
⅜ lb. of dried water soluble blood.
½ lb. of bentonite.
6 lbs. of "microfine" wettable sulfur.
2 qts. of liquid lime-sulfur.
2 lbs. of wettable 50% dichlorodiphenyl trichloroethane.

The above composition is mixed with 100 gallons of water to form a spray mixture.

Another illustrative formula which is highly effective for orchard spraying, and more particularly for spraying peaches, is set out as follows:

⅛ lb. of raw sienna.
⅜ lb. of dried water soluble blood.
½ lb. of bentonite.
2 lbs. of lead arsenate.
6 lbs. of wettable sulfur.
2 lbs. of 50% wettable DDT (dichlorodiphenyl trichloroethane).
4 lbs. of zinc sulfate.
6 lbs. of lime (hydrated).

The above ingredients are to be dispersed in 100 gallons of water.

The sticker composition comprising the raw sienna, dried blood, and bentonite may be produced separately and mixed with the fungicide or insecticide composition at the time the latter is being mixed with water for spraying purposes. If desired, however, the sticker composition may be initially mixed with the dry insecticide or fungicide and kept in sealed containers until ready for use in a spray or dust application.

It will be appreciated that in order to provide a composition in which the dried blood does not tend to float on the surface of the water but readily goes into solution without forming a foam and without tending to ball up while producing, with the other ingredients, a film which, after application to the fruit, becomes insoluble thereon, later disappearing after several weeks of surface weathering, the ingredients of the composition must be prepared in critical proportions. I have carried on my tests to determine the range of proportions which are critical in producing a composition having the above described effects. Such ranges, including the bentonite (without the clay) may be set out as follows:

| | Per cent |
|---|---|
| Sienna (preferably raw sienna) | 10–15 |
| Soluble dried blood | 20–50 |
| Bentonite | 30–67 |

The percentages are based upon weight of the constituents.

The following relative proportions (by weight) are found to give an unusually good product:

| | Per cent |
|---|---|
| Raw sienna | 12.5 |
| Soluble dried blood | 37.5 |
| Bentonite | 50 |

As hereinbefore stated, I prefer to employ with the bentonite a pyrophyllite clay, replacing about 90% of the bentonite with the clay. A critical range of proportions, including the clay, may be set out as follows:

| | Per cent |
|---|---|
| Sienna (preferably raw sienna) | 10–15 |
| Soluble dried blood | 20–50 |
| Pyrophyllite clay | 27.5–60 |
| Bentonite | 2.5–7.5 |

An unusually good product is obtained by employing the above constituents in the following proportions:

| | Per cent (by weight) |
|---|---|
| Raw sienna | 12.5 |
| Soluble dried blood | 37.5 |
| Pyrophyllite clay | 45 |
| Bentonite | 5 |
| | 100.0 |

As another specific example, the sticker was used as a component in a dust comprising zinc ethylene bis dithiocarbamate as the active fungicidal ingredient. This dust was applied to celery for the prevention of blight. For test purposes, one row of celery was dusted with the straight commercial fungicide, as described above. A second row was dusted with the above fungicide to which 4% by weight of our sticker composition had been added. A third row was dusted in like manner with the above-mentioned fungicide to which 8% of our sticker had been added.

Yields from the three treated rows were as follows:

1st row—19 lbs. of celery.
2nd row—28 lbs. of celery.
3rd row—48 lbs. of celery.

It is evident that the sticker was quite effective in retaining the fungicide in an active condition upon the celery despite some intermittent rains and heavy dews.

While in the foregoing specification, I have set forth certain details with respect to proportions, materials, etc., it will be understood that such details may be varied substantially by those skilled in the art without departing from the spirit of my invention.

I claim:

1. A sticker composition for insecticides and fungicides, consisting substantially of about 10–15% sienna, 20–50% of soluble blood protein, and about 30–67% of bentonite, such percentages being by weight.

2. A sticker composition for insecticides and fungicides, comprising, by weight, about 12.5% of raw sienna, 37.5% of soluble blood protein, and about 50% of bentonite.

3. A sticker composition for insecticides and fungicides, consisting substantially of, by weight, about 10–15% of raw sienna, about 20–50% of soluble dried blood, and about 30–67% of sodium montmorillonite.

4. A sticker composition for insecticides and fungicides, consisting substantially of, by weight, sienna in the percentage of about 10–15%, soluble blood protein in the percentage of about 20–50%, pyrophyllite clay in the percentage of about 27.5–60%, and bentonite in the percentage of about 2.5–7.5%.

5. A sticker composition for insecticides and fungicides, comprising, by weight, 12.5% of raw sienna, 37.5% of soluble dried blood, 45% of pyrophyllite clay, and about 5% of bentonite.

6. A sticker composition for insecticides and fungicides, consisting substantially of, by weight, about 10–15% of raw sienna, 20–50% of soluble dried blood, 27.5–60% of pyrophyllite clay, and 2.5–7.5% of sodium montmorillonite.

EARL D. CORNWELL.

References Cited in the file of this patent

UNITED STATES PATENTS

| Number | Name | Date |
|---|---|---|
| 1,945,542 | Tower | Feb. 6, 1934 |
| 2,346,362 | Dolman | Apr 11, 1944 |

FOREIGN PATENTS

| Number | Country | Date |
|---|---|---|
| 452,672 | France | Mar. 12, 1913 |